(12) United States Patent
Smith et al.

(10) Patent No.: US 11,093,962 B2
(45) Date of Patent: Aug. 17, 2021

(54) SYSTEM, METHOD, AND MATERIAL FOR ENCOURAGING STUDY OR MASTERY OF A FIBRE ART SKILL

(71) Applicant: SPINRITE INC., Listowel (CA)

(72) Inventors: Janet Elaine Smith, Brooklin (CA); Karen Margaret Cross, Huntsville (CA); John Verwey, Listowel (CA)

(73) Assignee: Spinrite Inc., Ontario (CA)

( * ) Notice: Subject to any disclaimer, the term of this patent is extended or adjusted under 35 U.S.C. 154(b) by 349 days.

(21) Appl. No.: 15/672,848

(22) Filed: Aug. 9, 2017

(65) Prior Publication Data

US 2018/0047040 A1  Feb. 15, 2018

Related U.S. Application Data

(60) Provisional application No. 62/373,679, filed on Aug. 11, 2016.

(51) Int. Cl.
| | | |
|---|---|---|
| *G06Q 30/02* | (2012.01) | |
| *D04B 3/00* | (2006.01) | |
| *B65H 75/18* | (2006.01) | |
| *D03D 51/00* | (2006.01) | |
| *D03J 1/00* | (2006.01) | |
| *D02G 3/44* | (2006.01) | |
| *D04B 31/00* | (2006.01) | |
| *B65H 75/06* | (2006.01) | |

(52) U.S. Cl.
CPC ......... *G06Q 30/0207* (2013.01); *B65H 75/06* (2013.01); *B65H 75/182* (2013.01); *D02G 3/44* (2013.01); *D03D 51/007* (2013.01); *D03J 1/007* (2013.01); *D04B 3/00* (2013.01); *D04B 31/00* (2013.01); *B65H 2701/53* (2013.01); *D10B 2401/18* (2013.01)

(58) Field of Classification Search
CPC ....................................................... D02G 3/12
See application file for complete search history.

(56) References Cited

U.S. PATENT DOCUMENTS

| | | | | |
|---|---|---|---|---|
| 8,506,303 B1 * | 8/2013 | Smith | ..................... | G09B 19/20 434/95 |
| 2012/0296465 A1 * | 11/2012 | Felice | ..................... | D04B 3/00 700/141 |

OTHER PUBLICATIONS

ISA Written Opinion PCT/CA2017/000186. (dated Aug. 11, 2016). (Year: 2016).*

The Yarn Loop, The future of yarn—knitting technology. (May 30, 2016). (Year: 2016).*

(Continued)

*Primary Examiner* — John Van Bramer

(74) *Attorney, Agent, or Firm* — Birch, Stewart, Kolasch & Birch, LLP

(57) ABSTRACT

A system, method, and material for encouraging study or mastery of a fibre art skill is provided. A fibre source material is incentivized to encourage individuals learning or mastering a fibre art skill by concealing a tracker in the fibre material or attaching it to the packaging of the fibre material. The tracker may be a coupon, token, or ticket that reveals a code, number, or some other form of identifier associated with an incentive. The tracker is revealed upon unwinding the fibre material while performing the fibre art skill, which allows the individual to exchange the revealed tracker for an incentive at, for example, a specific store, online, or through some other specified manner.

10 Claims, 4 Drawing Sheets

(56) References Cited

OTHER PUBLICATIONS

Wikipedia, Strain gauge. (Available at: https://en.wikipedia.org/wiki/Strain_gauge). (Year: 2019).*
Ho et al.: Development of a Low-Profile Sensor Using Electro-conductive Yarns in Recognition of Slippage, IEEE/RSJ International Conference on Intelligent Robots and Systems, Sep. 2011 (Year: 2011).*

* cited by examiner

SYSTEM, METHOD, AND MATERIAL FOR ENCOURAGING STUDY OR MASTERY OF A FIBRE ART SKILL

This non-provisional application claims the benefit under 35 U.S.C. § 119(e) to U.S. Provisional Application No. 62/373,679, filed on Aug. 11, 2016, all of which are hereby expressly incorporated by reference into the present application.

BACKGROUND

Becoming an expert in a fibre art such as knitting, crocheting, weaving, and the like, requires learning and mastering many various skills in the form of stitches, knots, weaves, and the like. This entails extensive practice, which often proves frustrating, repetitive, and/or isolating if done alone, and can be uninteresting or boring to the learning individual.

Thus a high rate of individuals who begin to learn the necessary techniques and stitches, knots and/or weaves for a fibre art lose interest due to the commitment of time that it takes to practice and perfect a fibre art skill. Thus, it is often that many new fibre art artisans sometimes get frustrated as they are trying to learn to knit, crochet, and/or weave and give up on learning the fibre art altogether.

Further, experienced fibre artisans often become "bored" with a project, or if a new skill, such as a knot, weave, and/or stitch, is "difficult", they may also stop their learning efforts by giving up or they may feel socially isolated and not commit the time necessary to perfect their skill.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

In embodiments of the present invention individuals are encouraged to learn or master a fibre art skill, such as knitting, crocheting, and/or weaving, by incorporating a tracker within an fibre material. In a specific embodiment, the tracker is located within a skein of fibre material so as to provide extra motivation that aids in increasing perseverance in the performance of the fibre art skill.

In further embodiments sensors are utilized during performance of the fibre art skill to transfer to a computer, smartphone or tablet collected data concerning the time and speed of the fibre art, such as knitting, crocheting, or weaving based on predefined valuation parameters, dynamically and interactively interact with an individual user to record uploaded information and offer teaching, assistance, social interaction with other fibre artisans.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

A fibre art may include any activity which utilizes as a source material, a fibre material, for example, knitting, crocheting, weaving, and/or sewing. In addition, a fibre material includes any material which is formed from spinning, weaving, and/or forming a fibre, for example, yarn, string, thread, fabric, and the like. For purposes of example, the following disclosure utilizes yarn as an exemplary fibre material, however, this is for explanation purposes only, as the embodiments disclosed herein may be utilized with any form of fibre material.

In one embodiment, a fibre material is incentivized to encourage individuals learning or mastering a fibre art skill by concealing a tracker in the fibre material. The tracker may be a coupon, token, or ticket that reveals a code, number, or some other form of identifier which allows the individual to exchange the coupon, token, or ticket for an incentive at, for example, a specific store, online, or through some other specified manner. Alternatively, the tracker may be a token which electronically transmits information for redemption as discussed in more detail below.

Figure 2A:
FIG. 2(*a*)-2(*c*) illustrate an exemplary fibre material according to embodiments of the invention
Figure 2B:
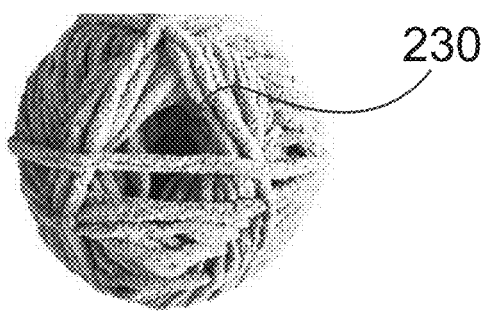
Figure 2C:
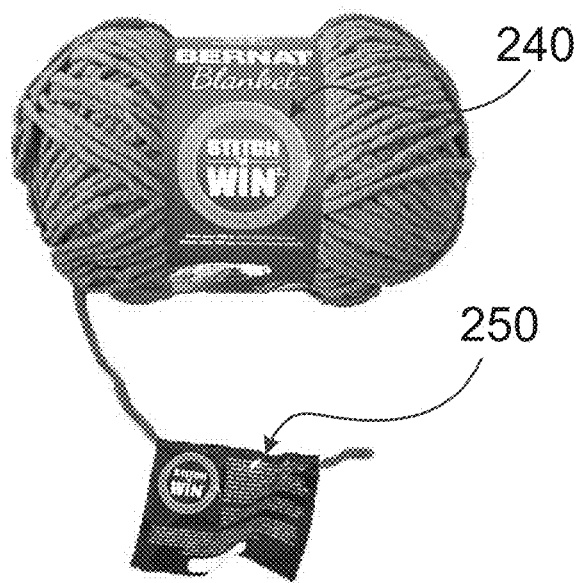

As shown in, FIGS. 2(*a*)-2(*c*) the fibre material may be a skein of yarn suitable for learning or mastering knitting and/or crocheting skill. The skein of yarn may be wound in a modified criss-cross pattern as illustrated in FIGS. 2(*a*)-2(*c*) to ensure that there are no open or unconcealed ends throughout the unwinding of the entire skein.

The tracker may be placed in the hollow 230, shown in FIG. 2*b*, created by the winding of the yarn into a skein and stays in place simply by a friction fit. Alternatively, or where the fibre material is too fine or delicate to wind into a suitable skein, the fibre material by being wound around a core of cardboard, plastic, or any other material, and the tracker may be contained in or provided on the core around which the fibre material is wound. The tracker may be secured within the skein using string, tape, glue, an elastic band of some kind, and/or any other suitable securing element/material which secures the tracker without permanently damaging the fibre material. Alternatively, the tracker may be provided on the outside of the fibre material, for example, as part of the skein packaging 220.

According to an embodiment, the tracker is provided as part of the fibre material packaging and provides, for example, instructions for redeemable incentives including municipal address delivery instructions for redeeming the incentives, and/or a web address the user may access to learn about possible incentives and/or as a set of requirements for qualifying for an incentive which are printed on the inside of the skein wrapper. According to this embodiment, an individual may be incentivized by accessing the provided website, following delivery instructions to a municipal address for incentive redemptions and/or tasks, or reading the requirements to complete the tasks required to receive an incentive. This allows the individual to track their own progress and provide/upload updates in the form of a photo or other identifying progress markers and the like to the associated website to quality for one or more incentives.

According to another embodiment, the tracker is concealed from view until a predefined amount of the fibre material has been used/unwound. For example, the tracker may be concealed in the core of the yarn skein or it could be concealed at a predefined position along the yarn concealed by the winding process. Concealment of the tracker allows for the suspense of not knowing when the tracker will appear, thereby encouraging a user to continue until the tracker is revealed.

According to another embodiment, the tracker may include multiple parts. A non-concealed part of the tracker may be attached on the outside of the yarn skein as shown in FIG. 2(*c*). The non-concealed part of the tracker may include a hangtag 250 or other item attached by various means including string, plastic, tape, and/or elastic, or provided on a label 240 affixed to the skein, as shown in FIGS. 2a and 2b, that can be activated with a code found inside the skein. The redemption pin code or transaction redemption number might only be visible via exposure to other material such as water, black light, etc. or a password key or something similar.

According to an exemplary embodiment, a method of encouraging an individual to learn or master a fibre art skill is provided. The process begins providing the individual with an incentivized fibre material, such as a skein of yarn with a tracker as discussed above. Then the individual using the fibre material is incentivized to continue to perform the fibre skill until one or more predefined conditions are met. The predefined conditions may include a certain number of stitches being performed, completing of a project using one or more predefined stitches, finishing a project having a certain difficulty, and/or using a predefined amount of the fibre material. Alternatively, in cases where the tracker is concealed from the individual, the predefined condition may be the uncovering of the concealed tracker. Once the predefined condition is met, the individual qualifies to receive one or more associated incentives. In doing so, the individual continues to use the fibre material to perform the stitching, crocheting, knotting, or weaving skill until the predefined condition is met thereby improving their skill level.

The redeemable incentive can be any item that will incentivize an individual to continue with their efforts in the respective fibre art. Some exemplary incentives include, but are not limited to, product or service coupons, prizes or awards; a achievements, coupons, collectibles, and the like that are of a higher value or increases in value for those who finish their fibre art project faster or more accurately.

Figure 1:
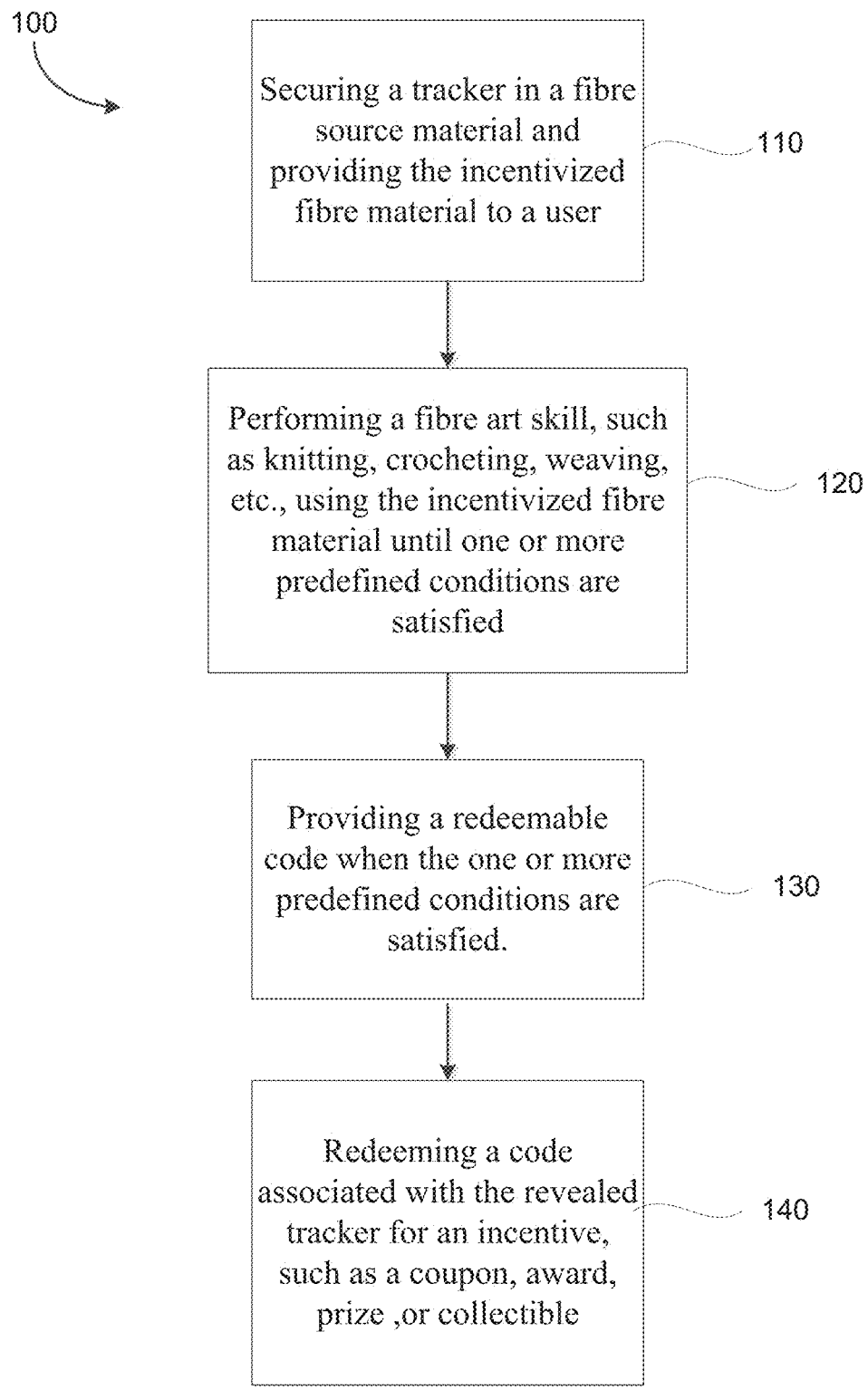
FIG. 1 is a block diagram of an exemplary embodiment of the invention

FIG. 1 illustrates an exemplary method for encouraging an individual to learn or master a fibre art skill. As shown in flowchart 100, a fibre material is incentivized by including a tracker within the fibre material and providing it to an individual (Step 110). The knowledge of the tracker encourages the individual to continue using the fibre material to perform the fibre art skill (e.g., the knitting, knotting, crocheting, and/or weaving) until the predefined condition is met (Step 120). Once the predefined condition is satisfied, the individual is provided with a redeemable code which is associated with an incentive. (Step 130) The individual can then retrieve/redeem the incentive using the code or identifier on the uncovered/exposed tracker 140.

Figure 3:
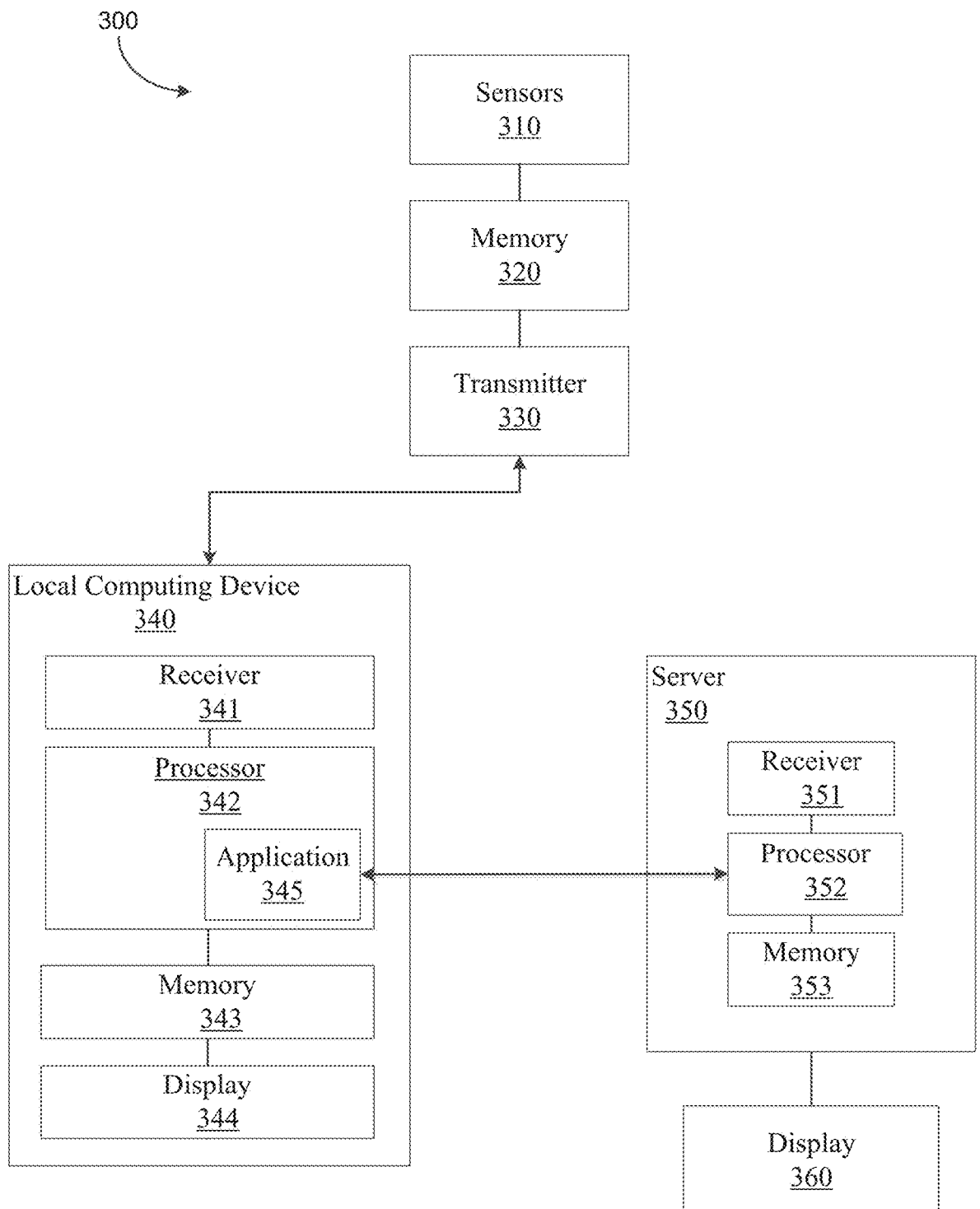
FIG. 3 is a block diagram of exemplary embodiment of the invention

According to an alternative embodiment rather than the individual having to redeem the incentive using the provided code, a system may be provided in which the progress of the individual is automatically tracked and redeemed. According to this embodiment, as illustrated in FIG. 3, sensing devices that obtain information pertaining to the individual and/or progress of the fibre art skill, for example, knitting, crocheting, or weaving are provided. The sensors 310 obtain data/information and store the information in a memory 320 prior to transmission that may or may not be included within the sensor. A transmitter 330 then transmits the data to a local computing device 340 used by an individual.

The local computing device 340 includes a receiver 361 that receives the data, a processor 342 that performs processing operations on the data, a memory 343 that stores the processed data and a display 344 that displays the processed data. The local computing device may also include one or more applications 345. One such application may be configured to control receipt of the data from the sensors 310, process the received data, and transmit the incentive information to a remote server 350 associated with the application 345. The remote server 350 includes a receiver 351 that receives the transmitted data, a processor 352 for performing processing operations on the data, and a memory 353 that stores the processed data. Data from the server 350 can then be sent to a display 350 that is remotely connected to the server at any location or back to the application 345 and displayed on display 344 in the local computing device 340.

The sensing devices 310 may be any type of sensing devices for tracking use of a fibre material. The sensing devices may interact/monitor either metallic or other conductive material provided in the fibre material as either continuous threads or at set distance points to allow electrical conductivity and communication. The sensing device 310 may be provided on or incorporated within metallic or other conductive metal tools for performing the fibre art skill, for example, knitting needle, crocheting needles or fids, weaving shuttles or wefts, or weaving warp frames. The needles, shuttles, fids, warp frames, and/or spindles on which fibre material may be mounted, can be either hard wired or wirelessly connected to the individual's computer, smartphone or tablet on which an application resides or the computer, smartphone or tablet can be connected to the application over the Internet or other network.

The sensors 310 may relay skill information related to use of the incentivized fibre material. The skill information may include an individual's timing and/or speed when performing the fibre art skill, or other quantitative information, such as, a number of knots, stitches, loops, or weaves. The skill information may also include qualitative information regarding the individual' skill, such as, consistency in knots, stitches, loops, or weaves. Redemption of an incentive in one or another embodiments might be tied to speed or consistency, or any other metric so that individuals who finish their fibre art project faster or more accurately may redeem for a higher level, or more valuable incentive. Thus, a component of the incentive is based on the skill of the individual.

In determining the time and accuracy of an individual in performing the fibre art skill, valuation parameters may be use and might include, number of rows knitted, looped, knotted, stitched or woven per period of time, the consistency or accuracy or improvement in consistency or accuracy of the looping, stitching, knotting, knitting or weaving per unit of time or other unit of measurement (e.g., a row or section of knitting, stitching, knotting, looping or weaving in a preset time frame and/or comparing that the earlier session by the knitter/crocheter, knotter, weaver/crafter or others doing the same project or knots, stitch, loop, weave, etc.), increase in speed per unit of measurement (i.e. a minute or other fixed period) as compared to earlier sessions on the same project, or speed or accuracy as compared to a relevant population of similarly aged or experienced knitters/crocheters/knitters/weavers/crafters doing the same loop or stitch or knot or weave or the same project.

The information may be obtained by, knitting needles, shuttles, fids and/or weaving frames embodying motion sensing technology able to sense wrist movement or needle-to-needle contact or shuttle or fid movement, and thereby being able to monitor and count stitches, knots loops or weaves made by the number of wrist movements or needle-to-needle contacts per stitch, loop, weave, or shuttle or fid movement, and the like.

Alternatively, or additionally, a separate unwinding spool device, for example, a spindle on which a spool can be mounted, may count revolutions as the fibre material is unwound and, with the input of fibre material and spool/skein size, effectively calculate and transmit to the application either the revolutions themselves (and then with inputs about the type, size, and length of fibre material, calculate in the application the amount and speed of the fibre used) or the spindle itself calculate that information and transmit it to the computing device on which an application resides either by a hard wire or wireless connection.

According to an embodiment, the fibre material or sensing device, is capable of wireless communication, such as, Bluetooth or similarly enabled, to allow the individual to interactively connect with the individual's computer, smartphone, and/or tablet through a downloaded application, interact socially with others involved in the same fibre art project, compete against others or the application in fibre art related games, and/or receive static and/or dynamic commentary and instruction on their fibre art skills, based on sensed information relayed to the application, via the Bluetooth or other connection, and/or manually entered data, such as starting and stopping times, number of rows, stitch/loop/knot/weave size, tightness, consistency, speed, and the like.

Any type of data could be collected, transmitted or filtered that is representative of the individual and fibre art activity. An individual could select the data to be conveyed from a set array (i.e. for example a pull down menu). For example the collected data may include one or more of the following:

1. Knitter/crocheter/weaver ID,
2. Knitter/crocheter/weaver self-assessed skill or experience level
3. Application operator historic knitter/crocheter/weaver assessed skill or experience level from past sessions
4. Knitter/crocheter/weaver age and sex
5. Knitter/crocheter/weaver geographic location
6. Knitting/crocheting/weaving session start time
7. Knitting/crocheting/weaving session pause time
8. Knitting/crocheting/weaving session stop time
9. Cumulative kitting/crocheting/weaving time per project (cumulative session times)
10. Amount of fibre material knitted, crocheted, knotted, stitched, looped or woven
11. Number of rows knitted, crocheted, knotted, looped, stitched or woven
12. Number of loops or knots tied or crocheted, or weaves made or loops made or stitches made
13. Number of knot, loop, crochet, weaving or stitching errors
14. Knot, loop, stitch, crochet, weaving and row consistency or tightness (how many knots or rows or loops or weaves completed without error or major deviation in knot/loop/weave size or tightness (knitter/crocheter/weaver can select deviation range or default to application operator set deviation of plus or minus 5%-10% of standard knot, loop, stitch or weave size for the project.
15. Knitting, crocheting, looping, stitching or weaving speed—number of knots, loops, weaves or stitches per set time period (previously defined and set by either user or others).
16. Size (diameter), type and length of yarn or thread or wound material.

The collected data is not limited to the above and may include any data information and statistical criteria for each individual and fibre art activity. Any of the data fields can either be stored on the individual's computer, smartphone or tablet and then loaded to the application, or sent directly to and stored in the application via an internet connection through the individual's computer, smartphone or tablet.

The application and the server may be controlled by and reside separately from the individual's computing device and may be part of the application being used to process and display the received data. Thus an individual user is able to download an interface application to his or her computer, smartphone or tablet so that he or she can connect in real time to the application and interpret, manipulate and display received data. The individual user can also do work off-line on his or her own computer, smartphone or tablet via a downloadable program to his/her equipment via the application. He or she can upload data collected and stored on his or her computer, smartphone or tablet to the online application from time to time.

A transmitting device may be provided separately or part of the sensor that transmits the obtained data by the sensors electronically via one or more transmission means, including wife, Bluetooth or hard wire. For example, regarding a skein of yarn/string/weaving material, the transmitter may be located within, on, or proximate to the spool and transmit signals generated by these sensory or conductive materials or these sensory conductive distance markers as the skein of yarn/string/weaving material is unwound.

Further, conductive knitting needles, shuttles, fids or weaving frames (i.e. metallic or other conductive material) with replaceable or rechargeable batteries or other power source and either hard wired, Bluetooth or WIFI connected to a computer device such as a computer, smartphone or tablet on which an application resides to process the data might also register the sensed information as milestone conductive markers when the knitting needles, shuttles, fids or weaving frames come into contact with conductive elements in the fibre material.

Dynamic commentary may be provided autonomously by an robotic algorithm located online or on the individuals computer device, at the application and may include sending preset messages and encouragement base upon an assessment by the application of the above data (i.e. keep going, your speed is improving, great work so far, your sessions are getting longer, you must be enjoying this project as it was the longest one for your project, etc.). Dynamic commentary might also be provided in person or by an online help line or interactive communication through the program to a human coach who can answer knitting, looping, crocheting, weaving, knotting and crafting questions and trouble shoot difficulties the knitter/crocheter/weaver is experiencing. Dynamic commentary can also be provide via a social network by which knitters/crocheters/weavers may chat with their social peers in the application or post questions for social peers to answer in the application.

The dynamic content would be relayed to the knitter/crocheter/weaver via the application on the knitter's/crocheter's/weaver's computer, smartphone or tablet or by telephone or text message.

In some embodiments, social interactions would work similarly to the way that most social networks operate. Users can friend other members, like their posts, comment on their posts, request and exchange information, see trends and trending on knitting, crocheting, weaving, crafting, etc. projects, watch teaching, how-to and informational videos, read articles about knitting, crocheting, weaving, crafting etc. and purchase and sell things of interest to the community of knitters, crocheters, and weavers.

If a competition ensues, individuals compete either against a clock, or against the application or against other in person or on-line participants in set knitting/crocheting/weaving activity competitions, for example knitting competitions. Individuals could compete in alone and remotely with information then uploaded to the application and compared with similar data information from other contest participants (individuals), and with results displayed in real time graphics on a screen, for example, a simulated horse race, obstacle course, relay race or bar charts. A contest might also be a singular event where by the individual user/contestant accumulates points for achieving various levels of success like number of projects completed, number of hours on the application per week, number of total knitting/crocheting/weaving hours, etc. As well, in some versions, achieve a certain status, by points or competitions, which results in an entry for a draw, tournament or other similar contest.

Most of the competitions will be virtual with contestants individually participating online, but other embodiments would encourage social networking and gatherings by knitters/crocheters/weavers meeting together in social environments to knit together and challenge the application or compete again each other.

Figure 4:
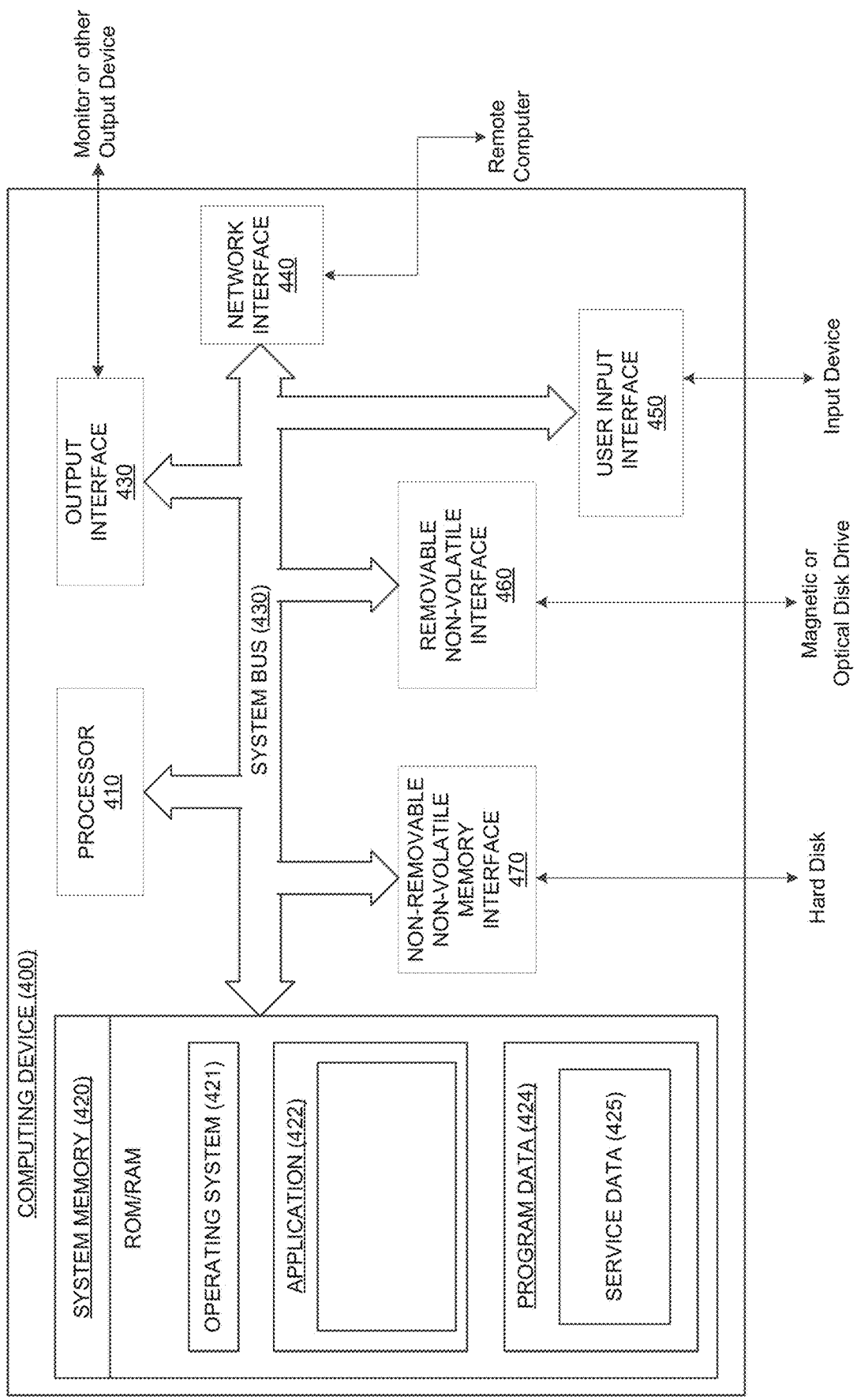
FIG. 4 is a block diagram illustrating an example computing device The headings provided herein are for convenience only and do not necessarily affect the scope or meaning of what is claimed in the present disclosure.

FIG. 4 is a high-level block diagram of an example computer (400) that is arranged for performing operations associated with embodiments of the present invention. In a very basic configuration (401), the computing device (400) typically includes one or more processors (410) and system memory (420). A system bus (430) can be used for communicating between the processor (410) and the system memory (420).

Depending on the desired configuration, the processor (410) can be of any type including but not limited to a microprocessor (µP), a microcontroller (µC), a digital signal processor (DSP), or any combination thereof. The processor (410) can include one more levels of caching, a processor core, and registers. The processor core can include an arithmetic logic unit (ALU), a floating point unit (FPU), a digital signal processing core (DSP Core), or any combination thereof. A memory controller can also be used with the processor (410), or in some implementations the memory controller can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). In some embodiments, the application (422) can be arranged to operate with program data (424) on an operating system (421).

The computing device (400) can have additional features or functionality, and additional interfaces to facilitate communications between the basic configuration (401) and any required devices and interfaces, such non-removable non-volatile memory interface (470), removal non-volatile interface (460), user input interface (450), network interface (440), and output peripheral interface (430). A hard disk drive may be connected to the system bus (430) through a non-removable memory interface (470). A magnetic or optical disk drive may be connected to the system bus (430) by the removable non-volatile interface (460). A user of the computing device (400) may interact with the computing device (400) through input devices such as a keyboard, mouse, or other input peripheral connected through a user input interface (450). A monitor or other output peripheral device may be connected to the computing device (400) through an output interface (430) in order to provide output from the computing device (400) to a user or another device.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (400). Any such computer storage media can be part of the device (400).

The computing device (400) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations. Additionally, the computing device (400) may operate in a networked environment where it is connected to one or more remote computers over a network using the network interface (450).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for encouraging study or mastery of a fibre art skill, the system comprising:
    fibre material for using in performing the fibre art skill, the fibre material having a tracker secured in a wound skein of the fibre material, where the fibre material includes a metallic or other conductive material spun in the fibre material;
    one or more sensing devices configured to track use of the fibre material by sensing the metallic or other conductive material while an individual is performing the fibre art skill; and
    at least one processor configured to
        receive information regarding use of the fibre material while performing the fibre art skill;
        determine whether or not one or more predefined targets have been achieved; and
        upon determining that one or more of the predefined targets has been achieved, providing an incentive to the individual that performed the fibre art skill.

2. The system of claim 1, wherein the metallic or other conductive material is spun in the fibre material as a continuous thread.

3. The system of claim 1, wherein the metallic or other conductive material is spun in the fibre material at set distance points within the skein.

4. The system of claim 1, wherein the sensing devices are provided on or incorporated within tools for performing the fibre art skill.

5. The system of claim 4, wherein the tools including one of needle, fids, weaving shuttles or wefts, and weaving warp frames.

6. The system of claim 1, wherein the sensing devices are configured to communication with an external computing device.

7. The system of claim 6, wherein the external computing device is a computer, smartphone or tablet.

8. The system of claim 1, wherein the at least one processor is a remote server.

9. The system of claim 1, wherein the at least one processor is further configured to determine a time and/or accuracy of an individual in performing the fibre art skilled based on a predefine set of valuation parameters and the information received from the one or more sensors.

10. The system of claim 1, wherein the incentive is one or more a product or service discount coupon, a prize or award, and a collectible.

* * * * *